(12) United States Patent
Schumann

(10) Patent No.: US 6,349,673 B1
(45) Date of Patent: Feb. 26, 2002

(54) BIRD FEEDER WITH REMOVABLE FEED TRAY

(76) Inventor: James A. Schumann, 10622 Highway 32 S., Hawley, MN (US) 56549

( * ) Notice: Subject to any disclaimer, the term of this patent is extended or adjusted under 35 U.S.C. 154(b) by 0 days.

(21) Appl. No.: 09/586,645

(22) Filed: Jun. 5, 2000

Related U.S. Application Data

(60) Provisional application No. 60/194,431, filed on Apr. 4, 2000.

(51) Int. Cl.$^7$ ............................................. A01K 39/012
(52) U.S. Cl. ..................... 119/52.2; 119/52.3; 119/57.8; 119/57.9
(58) Field of Search ............................. 119/52.2, 52.3, 119/52.4, 57.8, 57.9, 429, 430, 435

(56) References Cited

U.S. PATENT DOCUMENTS

| | | | |
|---|---|---|---|
| 2,875,729 A | * | 3/1959 | Gibson |
| 3,090,354 A | * | 5/1963 | Merritt et al. |
| 3,117,554 A | * | 1/1964 | Taylor |
| 3,316,884 A | * | 5/1967 | Viggars |
| 4,732,112 A | * | 3/1988 | Fenner et al. .............. 119/52.2 |
| 5,033,411 A | * | 7/1991 | Brucker ..................... 119/52.1 |
| 5,479,879 A | * | 1/1996 | Biek .......................... 119/52.2 |
| 5,568,789 A | * | 10/1996 | Koenig et al. ............. 119/57.9 |
| 5,682,835 A | * | 11/1997 | Walter et al. .............. 119/57.7 |

* cited by examiner

*Primary Examiner*—Charles T. Jordan
*Assistant Examiner*—Yvonne Abbott
(74) *Attorney, Agent, or Firm*—Merchant & Gould P.C.

(57) ABSTRACT

A feeder apparatus includes a support structure to secure the tray to the chamber of the feeder apparatus. The support structure is configured and arranged to readily allow dissembling/assembling of the feeder apparatus, particularly for refilling the chamber while in use, and for packaging/storing/shipping the feeder apparatus while not in use. In one embodiment, the feeder apparatus includes a chamber, a tray, and a support structure which secures the tray onto the chamber, the support structure being engaged at a first end to the chamber, and at a second end to the tray. The support structure includes a support member being generally disposed along a longitudinal axis of the chamber, an elastic member, and a pair of rods being connectable to the support member by the elastic member. The tray may include a through hole, and the pair of rods are connectable to the support member by the elastic member via the through hole on the tray.

10 Claims, 11 Drawing Sheets

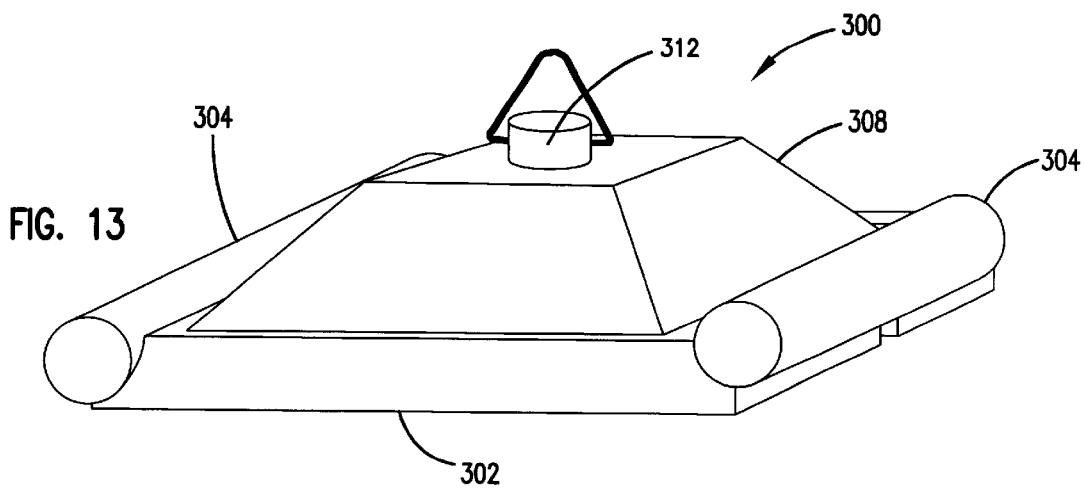
FIG. 13
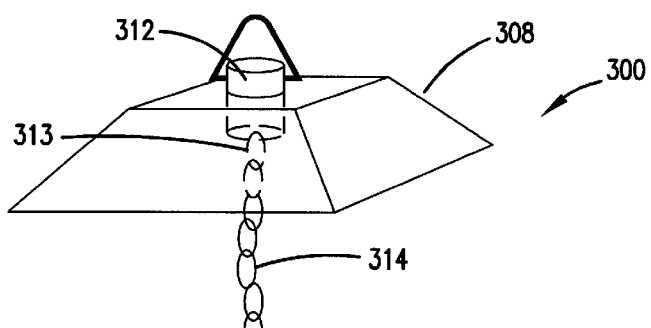
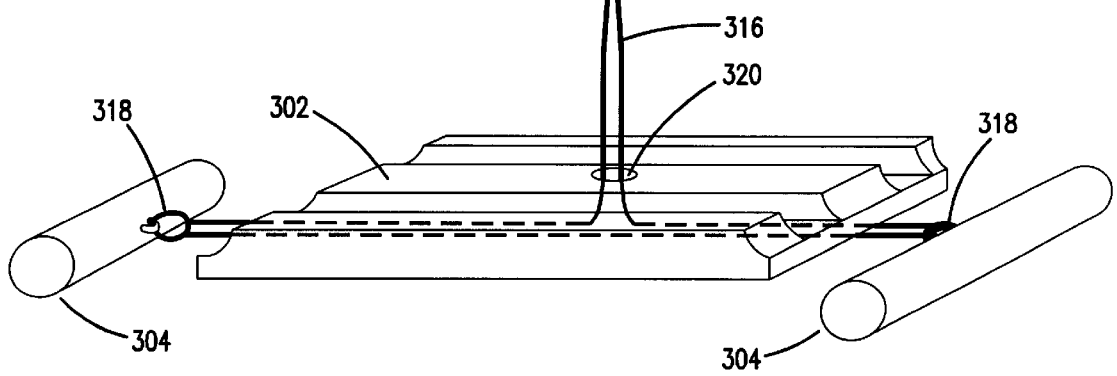
FIG. 14

BIRD FEEDER WITH REMOVABLE FEED TRAY

RELATED APPLICATION

This application claims the benefit of Provisional Application, U.S. Ser. No. 60/194,431, filed on Apr. 4,2000, entitled "BIRD FEEDER WITH REMOVABLE FEED TRAY", by James A. Schumann.

BACKGROUND OF THE INVENTION

1. Field of the Invention.

The present invention relates to a feeder apparatus, and more particularly, to a bird feeder apparatus with a removable feed tray and a method of securing the feed tray to a feed chamber of the feeder apparatus.

2. Description of Related Art

There are many types of bird feeders. One common type is a gravity feed type of bird feeder. This type of bird feeder contains a feed storage chamber and a feed tray. Gravity keeps the feed tray full by pulling seeds from the feed storage chamber. Although this basic concept is widely used, the means of connecting the feed tray to the feed chamber varies. One type of connecting means uses a fixed feed tray to a feed chamber.

The drawback of a fixed tray is that a bird feeder becomes awkward for packaging, shipping, and storage. This is because the fixed feed tray extends out from the feed chamber to allow the birds to perch.

Another drawback to the fixed feed tray is when using some type of materials, a bird feeder becomes heavier than it needs to be, because of the increased stock size and the hardware that is required to fix the feed tray to the feed chamber.

Therefore, there is a need for a feeder apparatus that can be arranged and constructed out of a variety of materials with a removable feed tray to allow shipping and storage with minimal amount of packing materials, yet remaining light weight and convenient for consumers to assemble and use.

It is with respect to these and other considerations that the present invention has been made.

SUMMARY OF THE INVENTION

To overcome the limitations in the prior art described above, and to overcome other limitations that will become apparent upon reading and understanding the present specification, the present invention discloses feeder apparatuses and methods of securing the tray of a feeder apparatus to the chamber of a feeder apparatus.

The present invention solves the above-described problems by providing a support structure which secures the tray of a feeder apparatus to the chamber of the feeder apparatus. Also, the support structure is configured and arranged to allow readily dissembling/assembling of the feeder apparatus, particularly for refilling the chamber while in use, and for packaging/storing/shipping the feeder apparatus while not in use.

In one embodiment, a feeder apparatus includes a chamber, a tray, and a support structure which secures the tray onto the chamber, the support structure being engaged at a first end to the chamber, and at a second end to the tray. The support structure includes a support member being generally disposed along a longitudinal axis of the chamber, an elastic member, and a pair of rods being connectable to the support member by the elastic member.

Further in one embodiment, in an assembled configuration, the rods are engaged to the tray by the elastic member, and the support member, the rods, and the elastic member latch the chamber onto the tray. In a packaged/stored configuration, the rods are disengaged from the tray by the elastic member, and the support member, the rods, and the elastic member are stored within the chamber.

Still in one embodiment, the chamber contains feeds while in use, and for storing the support structure while not in use.

Yet in one embodiment, a top of the chamber is engaged with the support member.

In another embodiment, the chamber includes a chamber top and a removable container. The removable container contains feeds while in use and is removed from the feeder apparatus while the feeder apparatus is in a packaged/stored configuration.

Further in another embodiment, the support structure further includes a chain which is connectable to the elastic member. In an assembled configuration, the rods are engaged to the tray by the elastic member, and the support member, the rods, the chain, and the elastic member latch the chamber onto the tray. In a packaged/stored configuration, the support member, the rods, and the elastic member latch the chamber top onto the tray.

Also, in one embodiment, in the packaged/stored configuration, the tray maintains attached to the support member by the elastic member.

Still in one embodiment, the tray has a through hole. The pair of rods are connectable to the support member by the elastic member via the through hole on the tray.

These and various other features and advantages of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTIONS OF DRAWINGS

Referring now to the drawings in which like reference numbers represent corresponding parts throughout:

FIG. 13 is a perspective view of the feeder apparatus of FIG. 11 in a packaged/storage configuration in accordance with the principles of the present invention.

FIG. 14 is a perspective, exploded view of the feeder apparatus of FIG. 13 in accordance with the principles of the present invention.

DETAILED DESCRIPTION OF THE PREFERRED EMBODIMENTS

In the following description of the exemplary embodiment, reference is made to the accompanying drawings which form a part hereof, and in which it is shown by way of illustration the specific embodiment in which the invention may be practiced. It is to be understood that other embodiments may be utilized as structural changes may be made without departing from the scope of the present invention.

The present invention discloses a feeder apparatus with a supporting mechanism to secure the tray to the chamber of the feeder apparatus. The present invention provides a support structure which secures the tray to the chamber of a feeder apparatus. The support structure is configured and arranged to readily allow dissembling/assembling of the feeder apparatus, particularly for refilling the chamber while in use, and for packaging/shipping the feeder apparatus while not in use.

Figure 1:
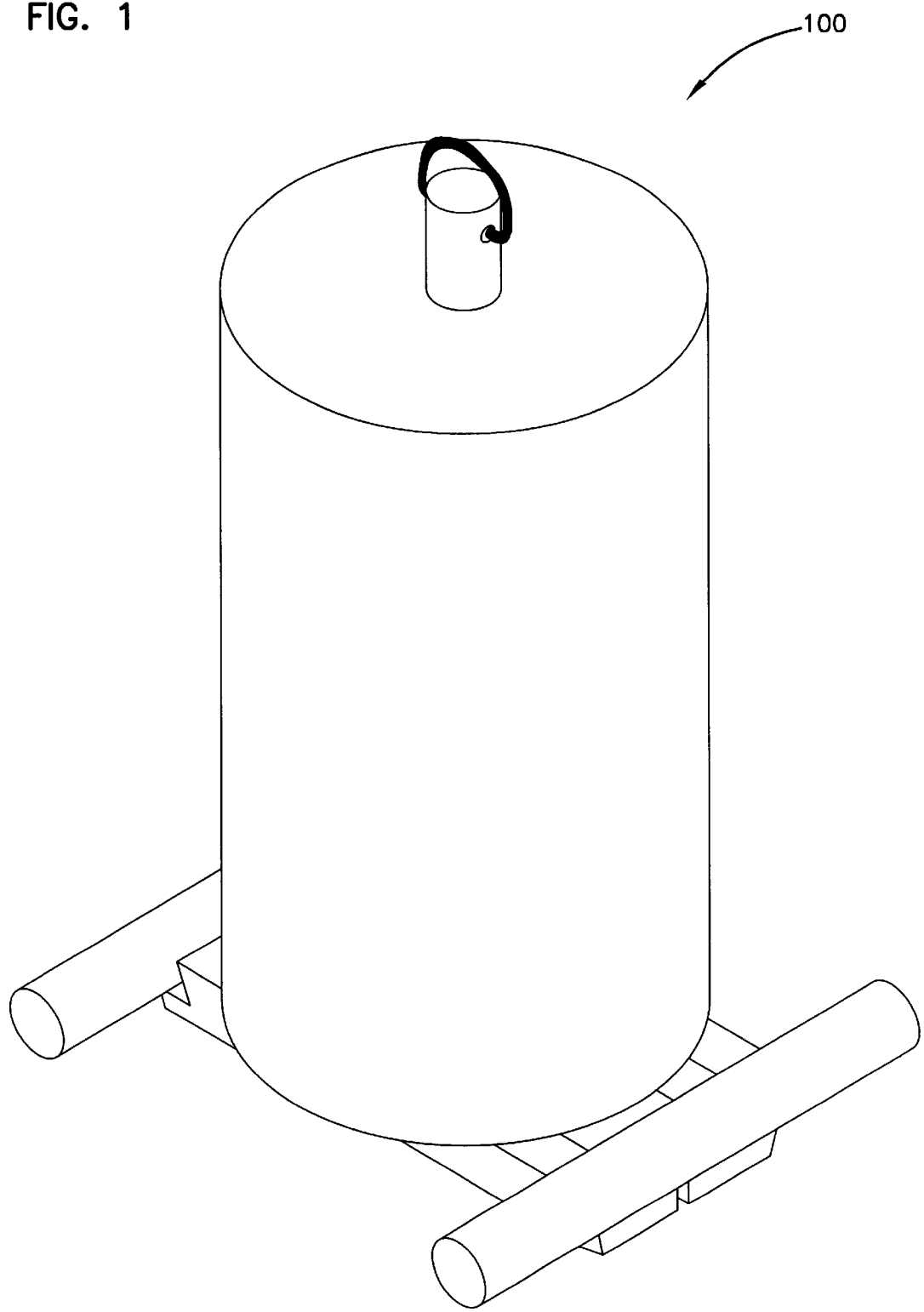
FIG. 1 is a perspective view of one embodiment of a feeder apparatus in accordance with the principles of the present invention.
Figure 2:
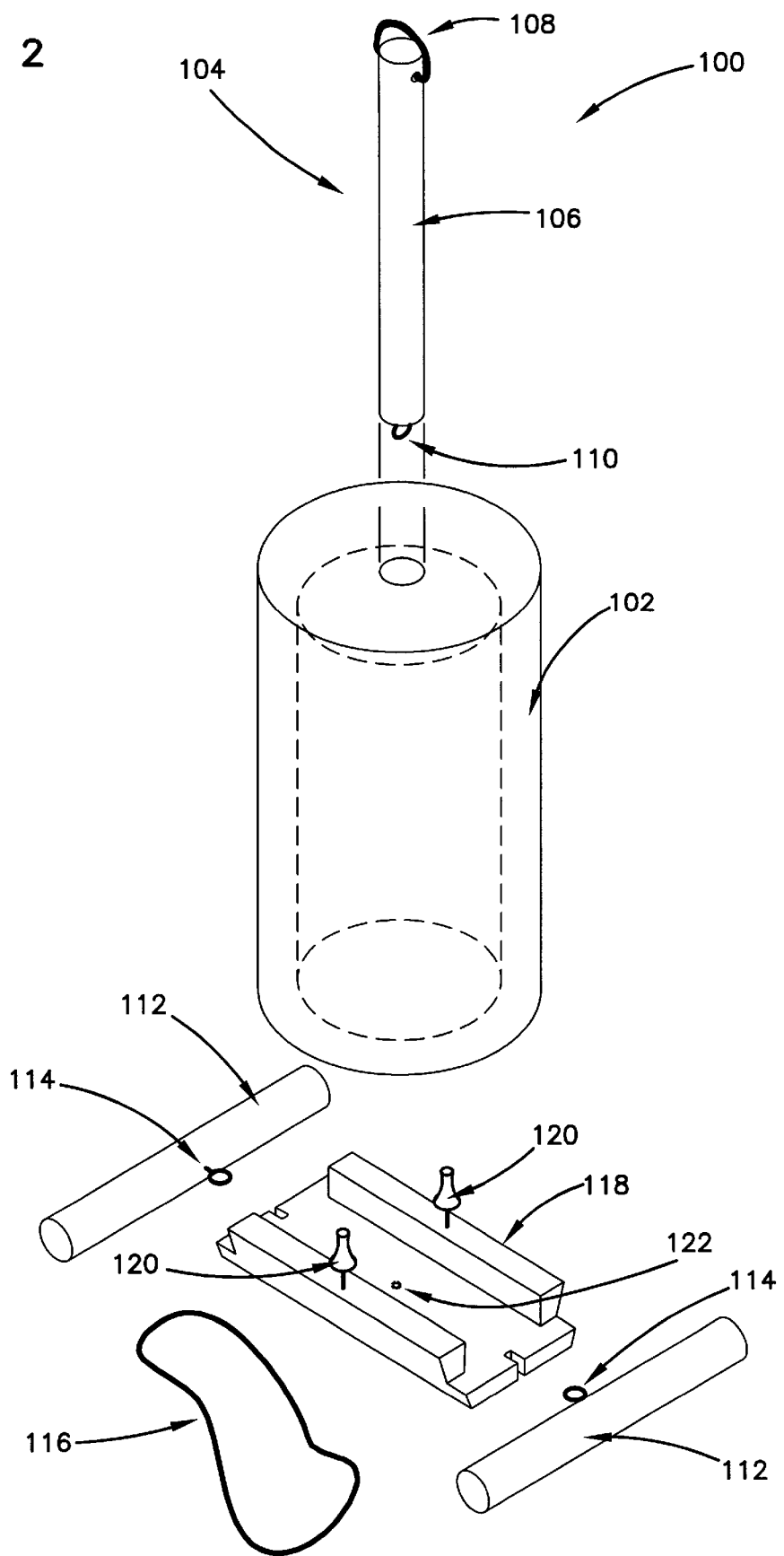
FIG. 2 is an exploded view of the feeder apparatus of FIG. 1 in accordance with the principles of the present invention.

With reference to the drawings, FIG. 1 illustrates one embodiment of a feeder apparatus 100 in its assembled configuration. In the exploded view shown in FIG. 2, the feeder apparatus 100 includes a feed storage chamber 102, a support structure 104 which includes a support dowel 106, an eye hook 110, a pair of perch dowels 112, a pair of eye hooks 114, and a binding strap 116. The feeder apparatus 100 also includes a feed tray structure which includes a tray 118 and a pair of guides 120. The support dowel 106 extends along a longitudinal axis of the chamber 102. The eye hook 110 is mounted at the end of the support dowel which is disposed within the chamber 102. A D-ring 108 may be disposed on the top of the support dowel, which can be used to hang the feeder apparatus onto a tree branch or a rope, etc.

Figure 3:
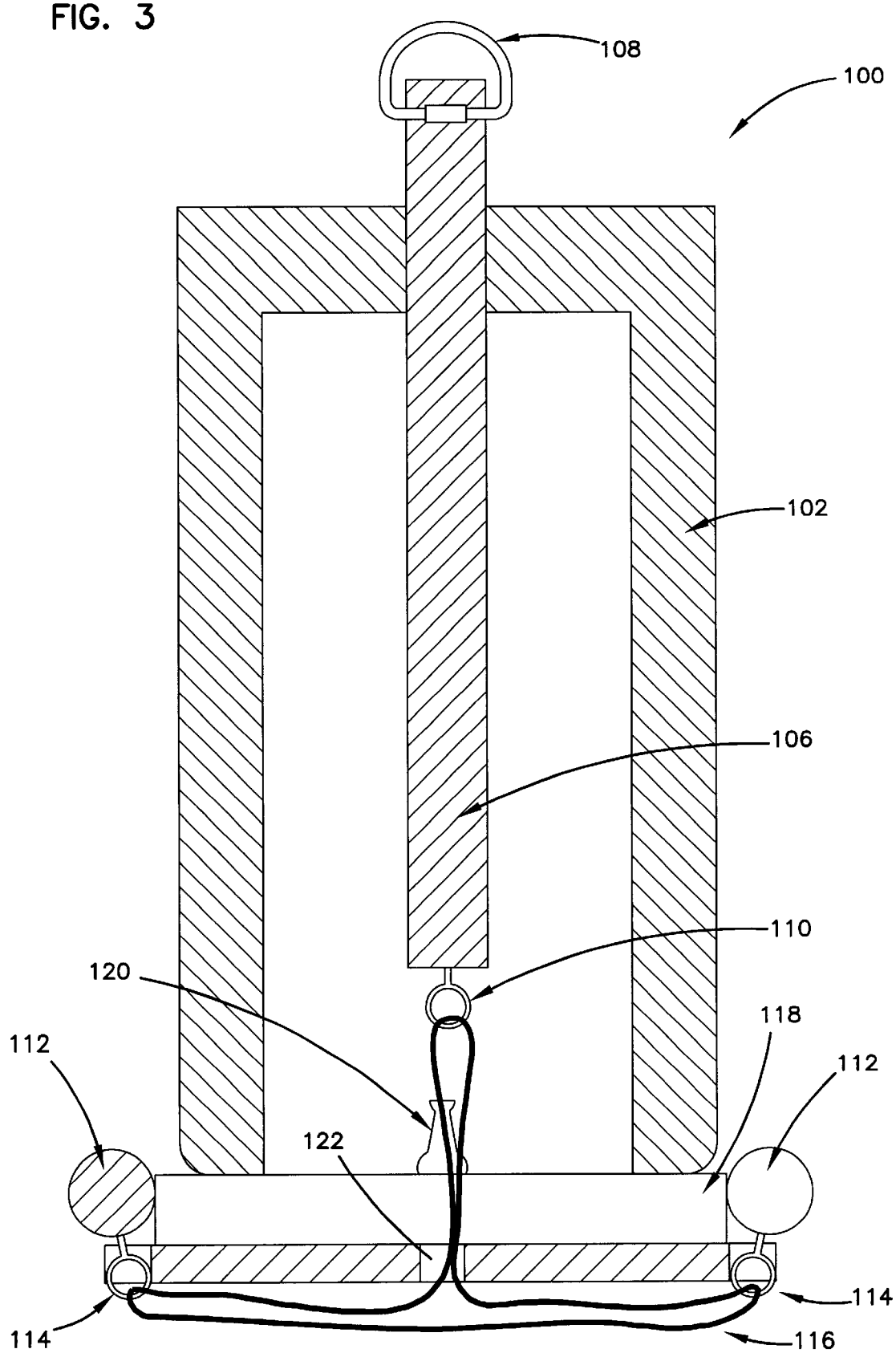
FIG. 3 is a cross sectional view of the feeder apparatus of FIG. 1 in accordance with the principles of the present invention.

As shown in FIG. 3, the support structure 104 secures the tray 118 to the feed storage chamber 102. The support dowel 106 engages to the top of the chamber 102 by a snug fit, glue, or the other equivalent means. The pair of guides 120 limit the side-to-side movement of the tray 118 with respect to the chamber 102 when the chamber 102 is placed on the tray 118. The pair of perch dowels 112 are pulled and latched to the two ends of the tray 118. The dowels 112 provide a perch for the feeding animals, such as birds. The dowels 112 also cap off the ends of the tray 118. Further, the dowels 112 provide a latch to secure the tray 118 to the feed storage chamber 102. A binding strap 116 is preferably an elastic strap which is used to hold the tray 118 to the feed storage chamber 102 when the perch dowels 112 are latched to the end of the tray 118. The binding strap 116 is attached to the pair of eye hooks 114 mounted on the side of the perch dowels 112. The binding strap 116 is also placed through a hole 122 proximate the center of the tray 118 and then attached to the eye hook 110.

As shown in FIG. 3, the feeder apparatus 100 is in the assembled configuration. The tray 118 and the pair of guides 120 are placed at the bottom of the feed storage chamber 102. The pair of perch dowels 112 are then pulled and latched to each end of the tray 118. This provides tension on the binding strap 116. The binding strap 116 holds the tray 118 to the feed storage chamber 102.

Figure 4:
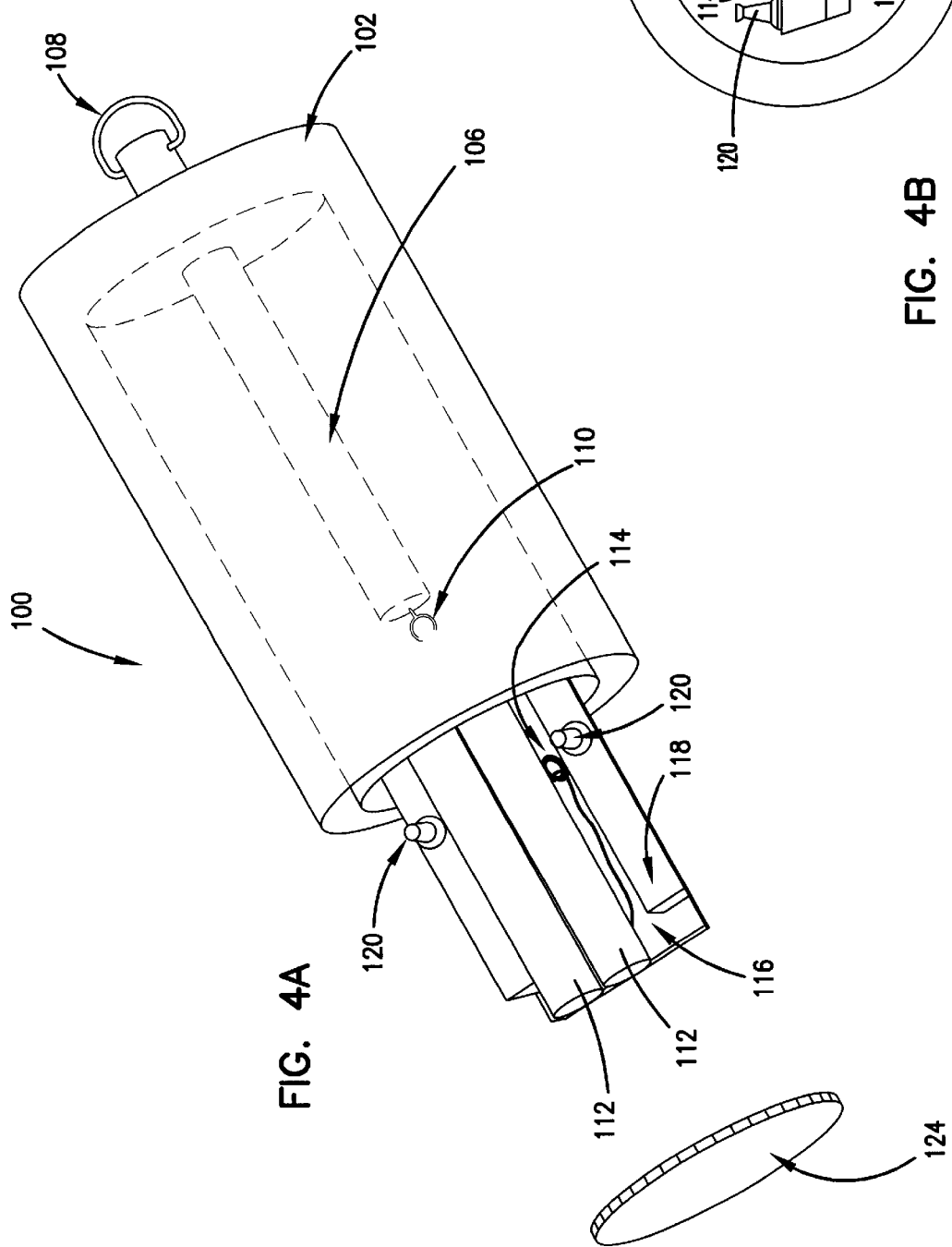
FIG. 4A is a perspective view of the feeder apparatus of FIG. 1 in a process of being packaged/stored in accordance with the principles of the present invention.
FIG. 4B is an end view of the feeder apparatus of FIG. 4A.
Figure 5:
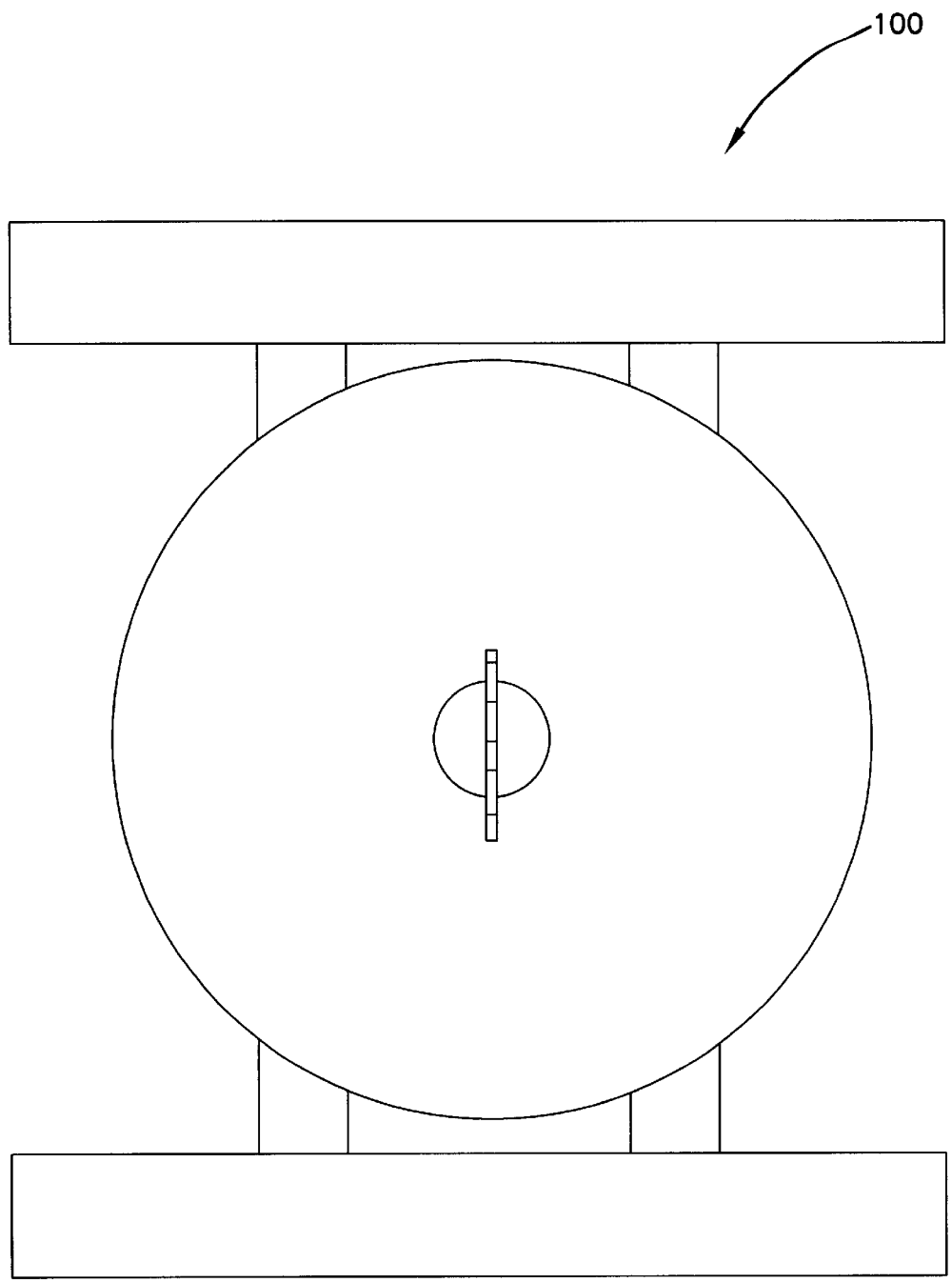
FIG. 5 is a top plan view of the feeder apparatus of FIG. 1 in accordance with the principle of the present invention.
Figure 6:
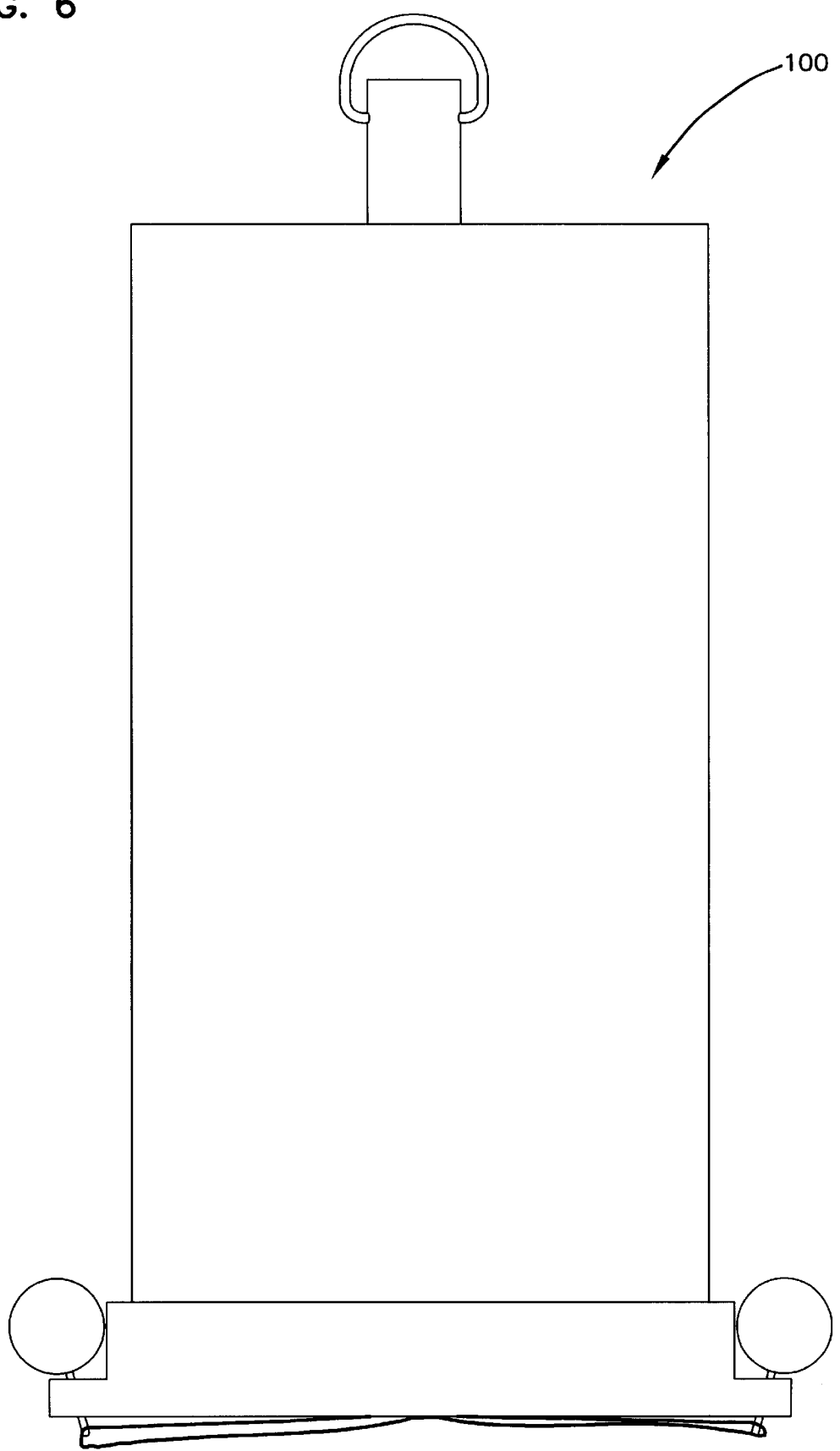
FIG. 6 is a front elevational view of the feeder apparatus of FIG. 1 in accordance with the principle of the present invention.
Figure 7:
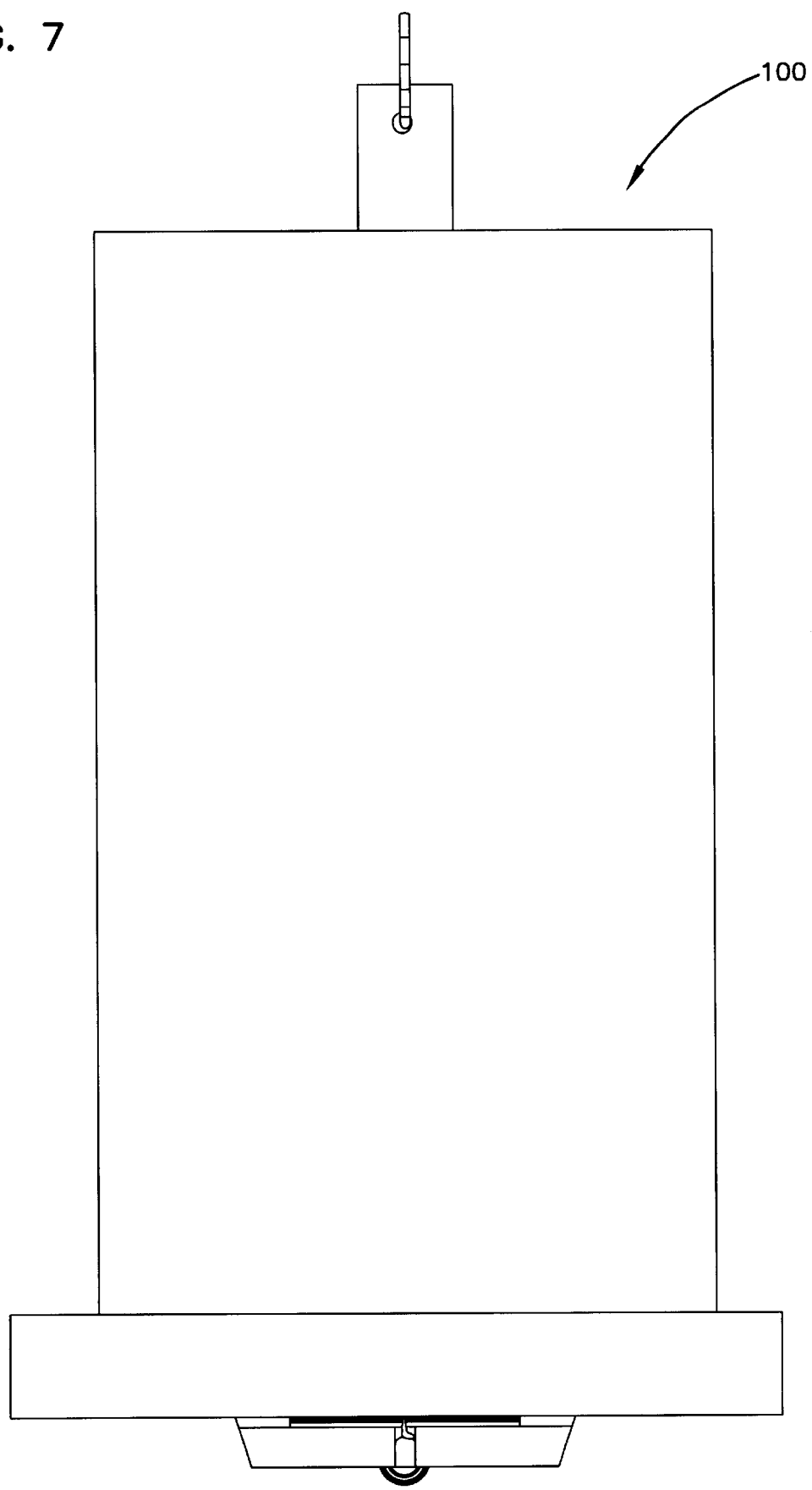
FIG. 7 is a left side elevational view of the feeder apparatus of FIG. 1 in accordance with the principle of the present invention, the right side elevational view being a mirror image of the left side view.
Figure 8:
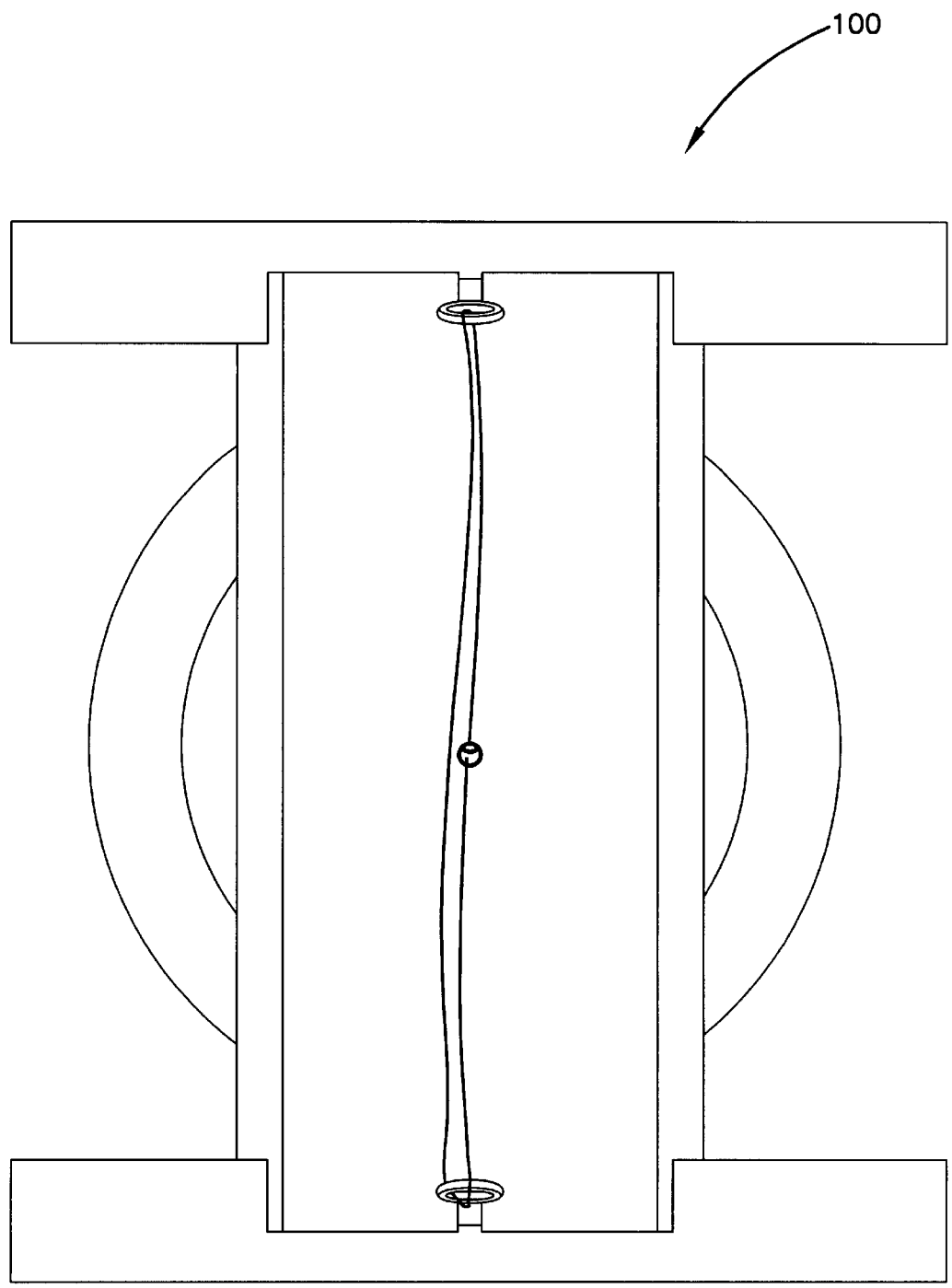
FIG. 8 is a bottom plan view of the feeder apparatus of FIG. 1 in accordance with the principle of the present invention.

In the embodiment shown in FIG. 4A, the feeder apparatus 100 is in a process of being packaged/stored in accordance with the principles of the present invention, for example, in a process of being placed in a consumer packaged/stored configuration. By unlatching the pair of perch dowels 112 from the ends of tray 118, the tension on the binding strap 116 is relieved. With the tension relieved on the binding strap 116, the pair of perch dowels 112 and the tray 118, remaining attached to the feed storage chamber 102, can be rotated and placed inside feed storage chamber 102. The tray 118 and the support structure 104 are retained inside the feed storage chamber 102 by a cover, for example, a product label 124. FIG. 4B illustrates the end view showing that the support structure 104 and the tray 118 are retained inside the chamber 102 with the cover removed.

FIGS. 5–8 illustrate top, front, side, and bottom views of the feeder apparatus shown in FIG. 1 in accordance with the principle of the present invention.

The embodiment shown in FIGS. 1–8 may be made of wood materials and any other suitable materials, such as plastic materials.

Figure 10:
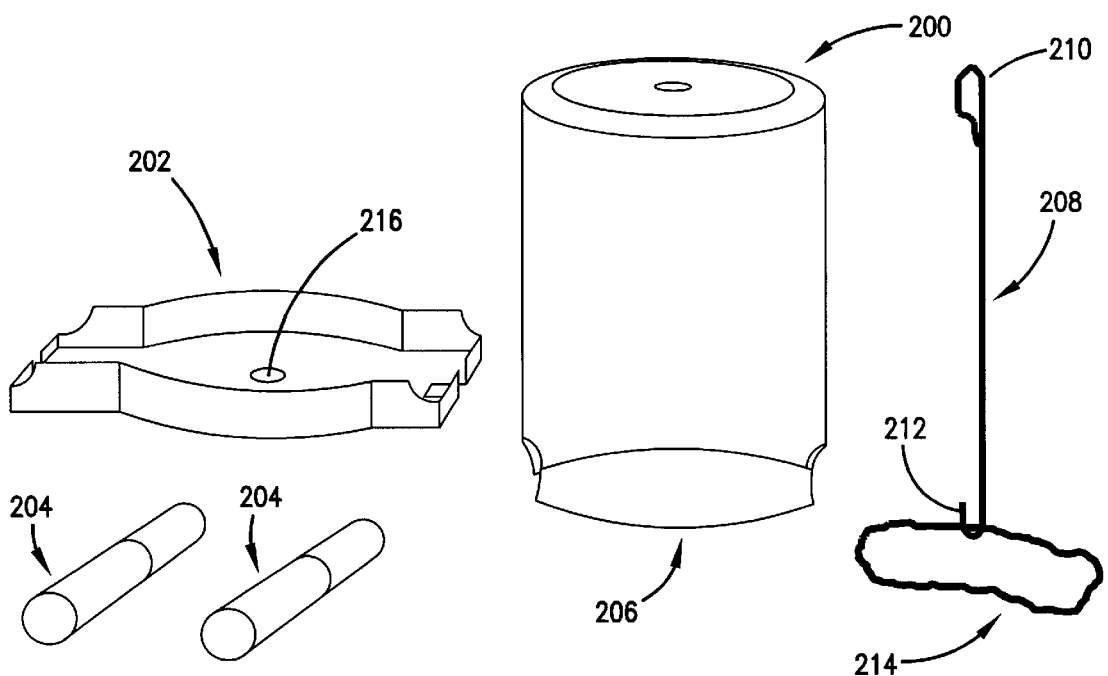
FIG. 10 is an exploded view of the feeder apparatus of FIG. 9 in accordance with the principles of the present invention.
Figure 9:
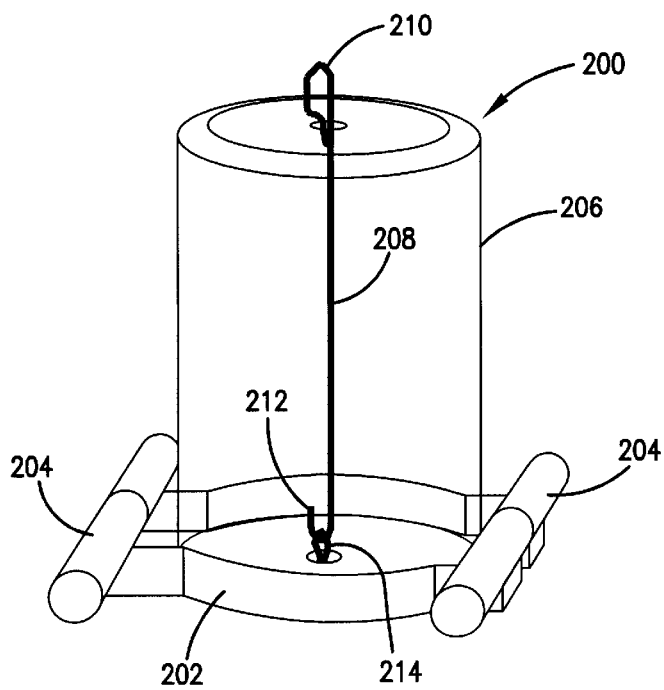
FIG. 9 is a perspective view of a second embodiment of a feeder apparatus in accordance with the principles of the present invention.

FIGS. 9–10 illustrate a second embodiment of a feeder apparatus 200 in accordance with the principles of the present invention. In this embodiment, a tray 202 and a pair of perch dowels 204 can be made of plastic materials. A feed storage chamber 206 may be made of wood. The support structure in FIGS. 9–10 is similar to the support structure shown in the first embodiment of FIGS. 1–8, except that the support dowel is now replaced by a support rod 208 with a hook 210 at one end and a second hook 212 at the other end. The hook 210 is engaged to the top of the feed storage chamber 206, and the hook 212 is disposed within the chamber to hook the binding strap 214.

In the exploded view shown in FIG. 10, the tray 202 is configured in a shape such that the tray 202 is adapted to fit with the bottom of the chamber 206. The tray 202 also has a hole 216 proximate the center of the tray 202 to allow the binding strap 214 to pass through. The two sides of the tray 202 extend outwardly to allow the feeding animals, such as birds, to reach the feeds (not shown) in the tray 202. Also, the two sides of the tray 202 are configured to receive the two perch dowels 204, respectively, thereby latching the tray 202 onto the chamber 206 in its assembled configuration as shown in FIG. 9.

Figure 11:
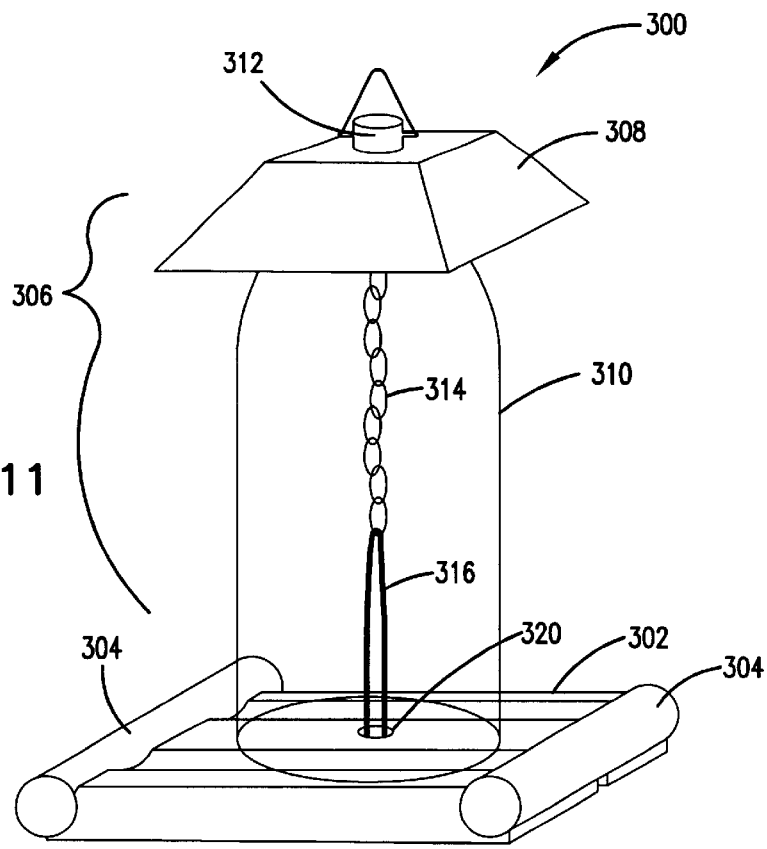
FIG. 11 is a perspective view of a third embodiment of a feeder apparatus in accordance with the principles of the present invention.
Figure 12:
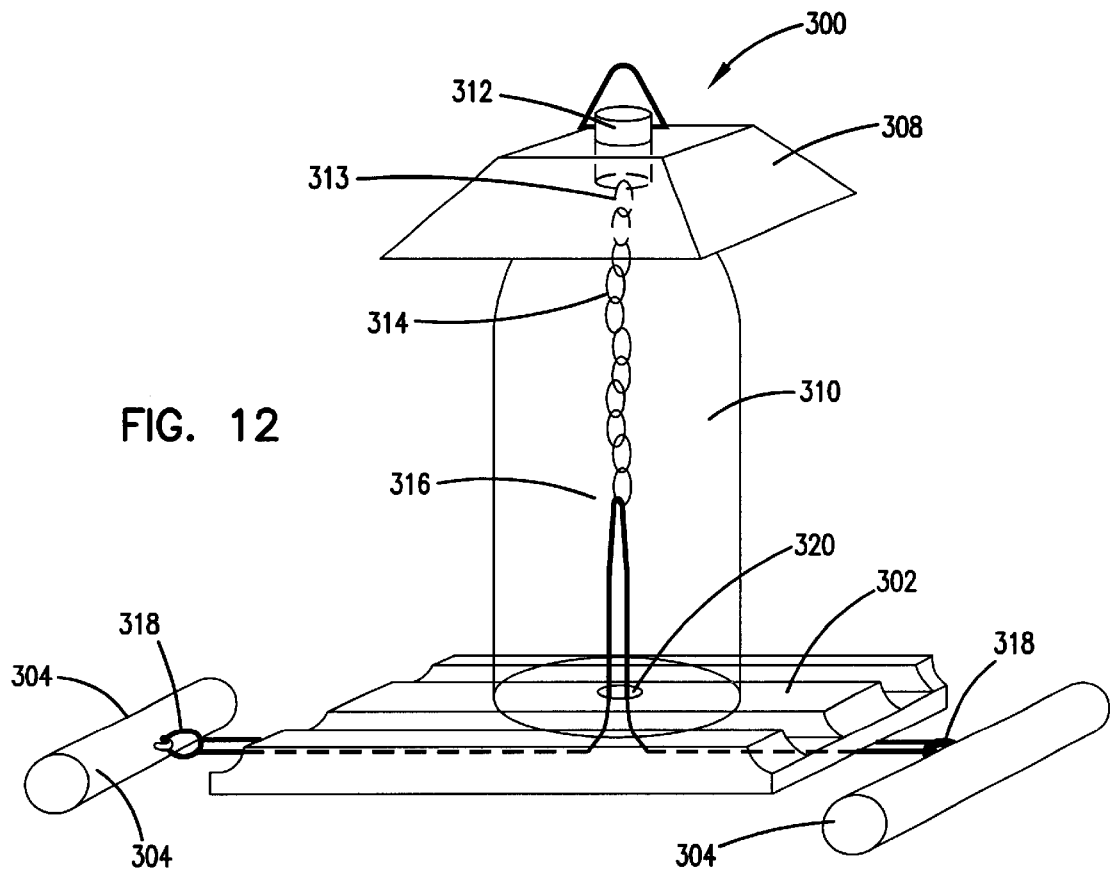
FIG. 12 is a perspective, partially exploded view of the feeder apparatus of FIG. 11 in accordance with the principles of the present invention.

FIGS. 11–14 illustrate a third embodiment of a feeder apparatus 300 in accordance with the principles of the present invention. In this embodiment, a tray 302 and a pair of perch dowels 304 can be made of wood materials. A feed storage chamber 306 includes a chamber top 308 and a chamber body 310. The chamber top 308 may be made of wood, and the chamber body 310 may be made of plastic materials. The chamber body 310 as shown in FIGS. 11 and 12 may be a bottom-cut pop bottle which can be supplied by a user, manufacturer, etc. The chamber body 310 may be transparent which allows the user to know whether s/he needs to refill the feeds (not shown). The chamber top 308 includes a receiving slot (not shown) to receive the top of the chamber body 310. The chamber body 310 is retained between a support dowel 312 and the tray 302. The support dowel 312 is engaged to the chamber top 308.

In FIGS. 11–14, a support structure includes the support dowel 312, an eye hook 313, a chain 314, a binding strap 316, a pair of perch dowels 304, and a pair of eye hooks 318. The support structure securely latches the tray 302 onto the chamber 306 in the assembled configuration as shown in FIGS. 11–12. FIGS. 13–14 show that the support structure latches the tray 302 onto the chamber top 308, with the chamber body 310 removed, in the packaged/stored configuration. In the packaged/stored configuration, the binding strap 316, instead of being hooked onto one end of the chain 314 as shown in FIGS. 11, 12, and 14, is hooked onto the eye hook 313 such that the tension is built on the binding strap 316 between the perch dowels and the eye hook 313. Accordingly, the chamber body 308 is collapsed with the tray. Similarly to the other embodiments, the binding strap 316 passes through a hole 320 disposed proximate the center of the tray 302.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A feeder apparatus, comprising:
    a chamber;
    a tray; and
    a support structure which secures the tray onto the chamber, the support structure being engaged at a first end to the chamber, and at a second end to the tray, the support structure, comprising:
        a support member being generally disposed along a longitudinal axis of the chamber;
        an elastic member; and
        a pair of rods being connectable to the support member by the elastic member, wherein in an assembled configuration, the rods are engaged to the tray by the elastic member, and the support member, the rods, and the elastic member latch the chamber onto the tray; and in a packaged/stored configuration, the rods are disengaged from the tray by the elastic member, and the support member, the rods, and the elastic member are stored within the chamber.

2. The apparatus of claim 1, wherein a top of the chamber is engaged with the support member.

3. The apparatus of claim 1, wherein the chamber includes a chamber top and a removable container, the removable container contains feeds while in use and is removed from the feeder apparatus while the feeder apparatus is in a packaged/stored configuration.

4. The apparatus of claim 3, wherein in the packaged/stored configuration, the tray maintains attached to the support member by the elastic member.

5. The apparatus of claim 1, wherein in the packaged/stored configuration, the tray maintains attached to the support member by the elastic member.

6. The apparatus of claim 1, wherein the tray has a through hole, and the pair of rods are connectable to the support member by the elastic member via the through hole on the tray.

7. A feeder apparatus, comprising:
    a chamber including a top and a removable container, wherein the removable container contains feed while in use and is removed from the feeder apparatus while the feeder apparatus is in a packaged/stored configuration;
    a tray; and
    a support structure which secures the tray onto the chamber, the support structure being engaged at a first end to the chamber, and at a second end to the tray, the support structure, comprising:
        a support member being generally disposed along a longitudinal axis of the chamber;
        an elastic member; and
        a pair of rods being connectable to the support member by the elastic member, wherein in the packaged/stored configuration the tray maintains attached to the support member by the elastic member.

8. A feeder apparatus, comprising:
    a chamber;
    a tray, and
    a support structure which secures the tray onto the chamber, the support structure being engagable at a first end to the chamber, and at a second end to the tray, the support structure, including:
        an elastic member; and
        a pair of rods connected to the elastic member and being resiliently engagable with the tray proximate opposite ends of the tray.

9. A feeder apparatus in accordance with claim 8, wherein the support structure extends from the tray along a longitudinal axis of the chamber to proximate a top of the chamber.

10. A feeder apparatus in accordance with claim 9, wherein the elastic member is attached to the top of the container by a support member.

* * * * *